I. J. KOHLER.
FIREPLACE DAMPER.
APPLICATION FILED FEB. 23, 1922.
1,432,189.
Patented Oct. 17, 1922.
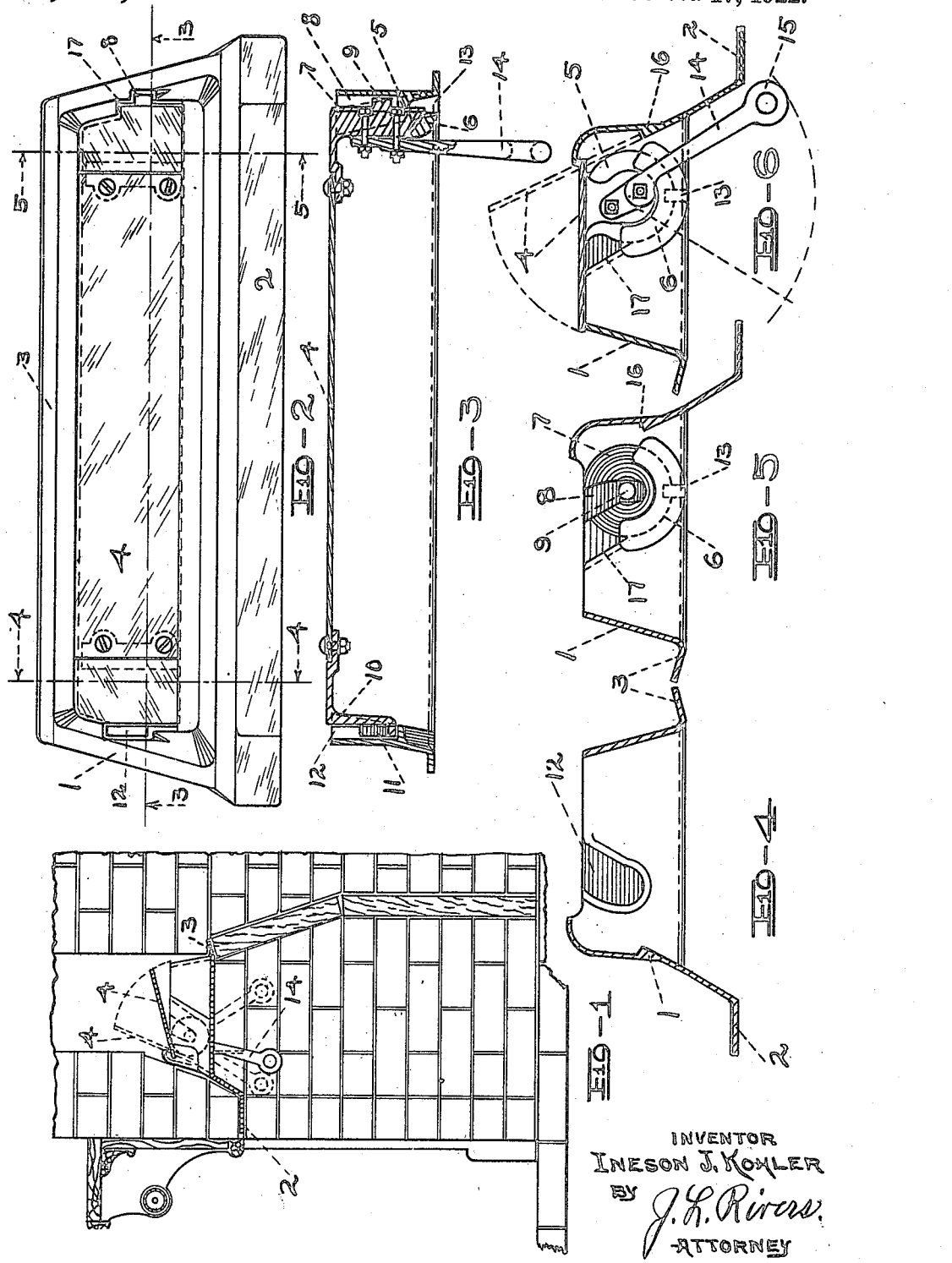
INVENTOR
INESON J. KOHLER
BY J. L. Rivers.
ATTORNEY Patented Oct. 17, 1922.

1,432,189

UNITED STATES PATENT OFFICE.

INESON J. KOHLER, OF SEATTLE, WASHINGTON.

FIREPLACE DAMPER.

Application filed February 23, 1922. Serial No. 538,569.

*To all whom it may concern:*

Be it known that I, INESON J. KOHLER, a citizen of the United States, residing at Seattle, in the county of King and State of Washington, have invented a new and useful Fireplace Damper, of which the following is a specification.

My invention, relating as it does to improvements in dampers particularly adapted for use in fireplaces, has for its objects, the provision of a damper the lid of which includes, as a part of its bearings, a beveled disc which permits the lid to be tilted to any required angle, is noiseless in its operation, and by virtue of the friction elements provided can be easily opened, through a convenient lever, and will remain so placed in any part of its travel.

The accompanying drawing illustrates an embodiment of my invention, wherein—

Figure 1 is a vertical section of a fireplace, with an end view of the damper as installed therein, showing the same partly open and illustrating the location of the actuating lever in said position, also, at the rear, the position of said lever when the damper is opened to its extreme limit, and at the front, the position of the same when the damper is completely closed.

Fig. 2, a plan view of the damper.

Fig. 3, a longitudinal section drawn on the line 3—3, of Fig. 2, particularly illustrating the bearings of the lid.

Fig. 4, a cross section drawn on the line 4—4, of Fig. 2, the lid being removed, showing a bearing of one of the lid trunnions, and the entrance thereto.

Fig. 5 a cross section drawn on the line 5—5, of Fig. 2, the lid, beveled disc and lever being removed, and the trunnion of the disc inserted in solid lines to indicate its operative position in the bearing provided therefor.

Fig. 6, a cross section on the line 5—5, of Fig. 2, showing the beveled disc, its bearing and lever, also indicating the position of the lid when fully opened.

Referring more particularly to the drawing, 1 denotes the body of the damper, provided with front and rear supports, 2 and 3 respectively, for mounting the body in the fireplace structure. The lid 4 has at one end a support bolted thereto carrying an integral beveled disc 5, Fig. 3, which is mounted in a bearing 6, connected with the adjacent end of the body, having a beveled socket complementary to the bevel on the disc; said disc and socket providing a friction pivotal connection for the lid. The side of the disc opposite its bevel is flat and is in frictional engagement with the end of the body illustrated by concentric circles and denoted 7, said end having a recess 8, adapted to carry the trunnion 9 of the beveled disc. Said opening, as indicated in Fig. 5, is enlarged at its upper portion, and inclined to the rear of the body, to permit the ready placing or removal of the lid and its connecting parts. As shown in Fig. 5, this opening is reduced in width in its lower portion, and while the trunnion 9, as illustrated, is in operative position, it will be noted that it does not extend to the extreme lower limit of this opening, which is somewhat below center. The opening, at its reduced end, is thus designed to prevent lateral movement of the trunnion, and at the same time permit a downward movement thereof, so that the friction of the beveled disc 5 will be borne by its beveled bearing 6 and said end of the body 7.

The other end of the lid is provided with a support 10, which terminates in a trunnion 11, Fig. 3, operating in the opening 12. This opening also inclines to the rear of the body to permit an easy placement or removal of the lid. Its lower portion affords a bearing for the trunnion 11, which is of large size, to afford more friction than is necessary to carry the load.

An opening 13 in the body, communicating with the beveled disc and its bearings, permits the passing out of any extraneous matter, which otherwise might accumulate and interfere with the free frictional contact of the disc with said bearings.

The lever 14, which serves to tilt the lid to any required angle in opening or closing the damper, is bolted to the beveled disc, and is provided with an opening 15 at its free terminal, for engagement with a poker in manipulating the lid, the dotted lines in Fig. 6 indicating its field of movement.

Fig. 6 illustrates the position of the lid when it is raised to its extreme limit, and when thus raised it comes in alignment with a shoulder 16, extending longitudinally of the body, and affords, in connection with the body, a straight draft, free from obstructions. 17 denotes an offset portion of the body to afford a guide way for the beveled disc in placing or removing the lid, it being in spaced parallel relation with the opening 8, in which the disc trunnion is mounted.

In utilizing the damper, it is installed in the fireplace structure as indicated in Fig. 1, and manipulated by the movement of the lever, as before indicated. A distinctive feature of this invention is, that the damper can be raised or lowered to any position in its travel, including the smallest practical fraction of an inch. This is effected by the friction elements provided, and on which the lid operates. The beveled disc 5, working in the beveled bearing 6, and carrying weight of the lid and the lever, causes not only a heavy frictional contact of said elements, but the incline of the respective bevels in such that the flat side of the disk also comes into heavy frictional contact with the end of the body, said contact being indicated by the concentric circles 7, before described. The trunnion 11, at the other end of the lid, being of large size, also provides further frictional contact at said end, all being sufficient to maintain the lid in any position to which it is moved by the lever. Heretofore, fireplace dampers have been made, which were operable by a lever, but their lids could only be opened and maintained at certain predetermined points, the stops provided therefor making the action of the damper noisy, and so uneven in its movements as to often cause the lid to be thrown out of place; in no event permitting the fine regulation as to distance between the lid and the throat in opening or closing, the ease of operation, or noiseless action of this damper.

In Fig. 6 it will be noticed that the bearings of the lid are mounted forward of center, the major portion of the lid being back of center, and the lever extending forward of center, thus causing an equal balance, and in this embodiment of the invention the throat of the damper is opened at the back. Should it prove desirable to open the damper at the front, obviously the bearings can be placed in a reversed position past center, and such an opening effected, or the bearings can be placed in the center, and the lid be made to open slightly, both to the front and back at the same time.

Other changes in and modifications of the construction described may be made without departing from the spirit of my invention or sacrificing its advantages, hence I ask that I be not confined to the specific structure set forth.

I claim:

1. A fireplace damper, comprising a body having longitudinally extending openings at top and bottom, a lid therefor, a beveled disc, having a plane surface on the side opposite the bevel and a trunnion, at one end of the lid, a trunnion of large size at the other end of the lid, a beveled socket bearing for the disc at one end of the body, an opening in the end of the body to receive and support the disc trunnion against lateral displacement, the lower terminal thereof extending below the operative position of said trunnion, an opening at the other end of the body to receive and carry the second trunnion, an actuating lever connected with the disc, and an opening extending from the disc and its bearings through the bottom of the body.

2. A fireplace damper, having a body open at top and bottom, a lid, extending longitudinally of the body, pivotal connections for the lid, comprising a trunnion at one end of the lid and a bearing therefor in the body, a friction disc at the other end of the lid and a bearing therefor in the body, adapted to afford heavy frictional engagement with said disc, and a lever connected therewith for opening or closing the lid.

3. In a fireplace damper, a friction pivotal connection, including a beveled disc, having a plane surface on the side opposite the bevel and carrying a trunnion, a beveled bearing for said disc, and a socket for the trunnion.

4. In a fireplace damper, a lid, having at one end a support angularly disposed with relation to the body and terminating in a beveled disc, the other end having a support likewise angularly disposed with relation to the body, and terminating in a trunnion adapted to afford more frictional contact than is necessary to carry the lid.

INESON J. KOHLER.